United States Patent
Shimizu

(10) Patent No.: US 8,537,440 B2
(45) Date of Patent: Sep. 17, 2013

(54) IMAGE READING APPARATUS AND METHOD, AND STORAGE MEDIUM

(75) Inventor: Koji Shimizu, Tokyo (JP)

(73) Assignee: Canon Kabushiki Kaisha (JP)

(*) Notice: Subject to any disclaimer, the term of this patent is extended or adjusted under 35 U.S.C. 154(b) by 445 days.

(21) Appl. No.: 12/756,539

(22) Filed: Apr. 8, 2010

(65) Prior Publication Data

US 2010/0259797 A1 Oct. 14, 2010

(30) Foreign Application Priority Data

Apr. 10, 2009 (JP) ................................. 2009-095924

(51) Int. Cl.
*H04N 1/46* (2006.01)
*H04N 1/04* (2006.01)
*G03G 15/22* (2006.01)
*G03G 15/00* (2006.01)
*G03B 35/14* (2006.01)

(52) U.S. Cl.
USPC ........... 358/505; 358/474; 358/497; 399/144; 399/364

(58) Field of Classification Search
USPC ........... 358/474, 497, 505, 526, 530; 399/92, 399/144, 364, 401; 355/23, 24
See application file for complete search history.

(56) References Cited

U.S. PATENT DOCUMENTS

| | | | | |
|---|---|---|---|---|
| 4,190,350 A | * | 2/1980 | Donohue et al. | 399/86 |
| 4,758,862 A | * | 7/1988 | Fukae et al. | 399/401 |
| 4,763,167 A | * | 8/1988 | Watanabe et al. | 347/155 |
| 5,119,213 A | * | 6/1992 | Graves et al. | 358/488 |
| 5,241,397 A | * | 8/1993 | Yamada | 358/296 |
| 5,255,054 A | * | 10/1993 | Tsai | 399/7 |
| 6,389,183 B1 | * | 5/2002 | Han | 382/313 |
| 6,393,252 B1 | * | 5/2002 | Yamagishi | 399/401 |
| 7,130,091 B2 | * | 10/2006 | Ishimaru et al. | 358/496 |
| 7,190,480 B2 | * | 3/2007 | Sturgeon et al. | 358/1.17 |
| 7,268,909 B2 | * | 9/2007 | Nakagiri | 358/1.16 |
| 7,477,427 B2 | * | 1/2009 | Fujikawa et al. | 358/474 |
| 7,529,000 B2 | * | 5/2009 | Ishida et al. | 358/474 |
| 7,791,755 B2 | * | 9/2010 | Mori | 358/1.18 |

(Continued)

FOREIGN PATENT DOCUMENTS

JP 2008-141590 A 6/2008
JP 2008-242155 A 10/2008

OTHER PUBLICATIONS

Office Action issued in Counterpart Japanese Application No. 2009-095924 dated Jun. 18, 2013.

*Primary Examiner* — Madelein A Nguyen
(74) *Attorney, Agent, or Firm* — Rossi, Kimms & McDowell LLP

(57) ABSTRACT

An image reading apparatus that can automatically read images on a plurality of pages stored in electronic paper without setting the electronic paper on a page-by-page basis even when using an original fixed reading method. A scanner unit reads an image on an original placed on an original platen glass by scanning the original by moving a reading unit from one end of the original to the other end. Communication with electronic paper is carried out to acquire image information stored in the electronic paper. An image file of which image is to be read is selected from the displayed image information. An image display on the electronic paper placed on the original platen glass is controlled by communicating with the electronic paper using a communication unit. The scanner unit scans in images of the selected image file displayed on the electronic paper on a page-by-page basis.

5 Claims, 11 Drawing Sheets

(56) References Cited

U.S. PATENT DOCUMENTS

| | | | | |
|---|---|---|---|---|
| 7,843,614 B2* | 11/2010 | Iwago | | 358/498 |
| 7,953,341 B2* | 5/2011 | Tobinaga et al. | | 399/92 |
| 8,054,483 B2* | 11/2011 | Katsuyama | | 358/1.14 |
| 8,089,647 B2* | 1/2012 | Hotta et al. | | 358/1.15 |
| 2003/0223780 A1* | 12/2003 | Kobayashi | | 399/196 |
| 2004/0057079 A1* | 3/2004 | Ohsawa | | 358/2.1 |
| 2004/0190080 A1* | 9/2004 | Kodama et al. | | 358/474 |
| 2005/0289182 A1* | 12/2005 | Pandian et al. | | 707/104.1 |
| 2006/0171002 A1* | 8/2006 | Mori | | 358/538 |
| 2007/0127961 A1* | 6/2007 | Han et al. | | 399/364 |
| 2007/0171485 A1* | 7/2007 | Yachida | | 358/474 |
| 2008/0055389 A1* | 3/2008 | Bush et al. | | 347/234 |
| 2008/0130071 A1 | 6/2008 | Katsuyama | | |
| 2008/0273228 A1* | 11/2008 | Takano et al. | | 358/497 |
| 2009/0141307 A1* | 6/2009 | Slijp et al. | | 358/1.15 |
| 2010/0092095 A1* | 4/2010 | King et al. | | 382/229 |
| 2010/0302601 A1* | 12/2010 | Mori | | 358/401 |

* cited by examiner

FIG.5

ELECTRONIC PAPER HAS BEEN DETECTED.
FILE SELECTION

PLEASE SELECT FILE TO BE PROCESSED.

| FILE NAME | NUMBER OF PAGES | SIZE |
|---|---|---|
| aaa | 3 PAGES | A4 |
| bbb | 100 PAGES | A4 |
| ccc | 30 PAGES | A4 |
| ddd | 1 PAGE | A4 |

OK   CANCEL

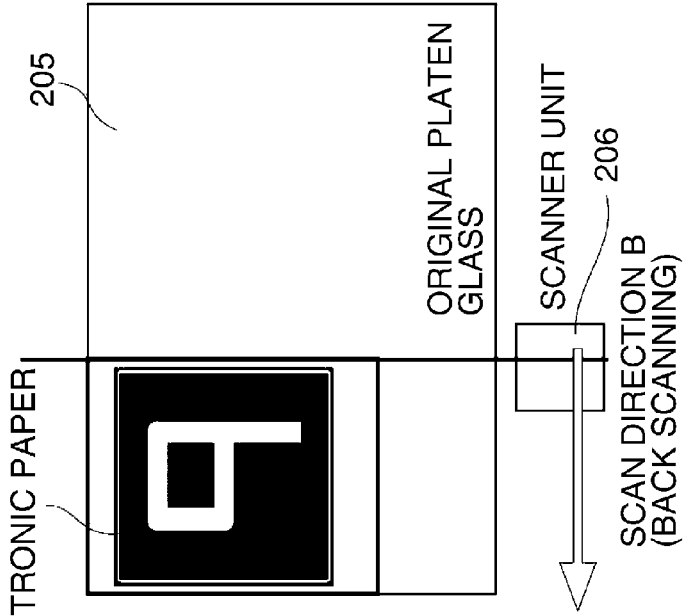
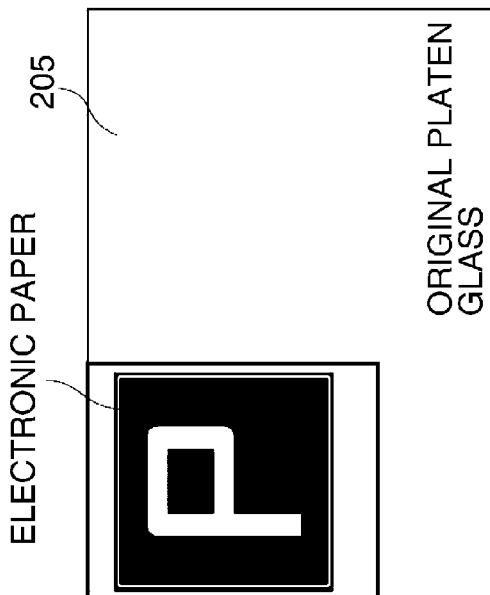

IMAGE READING APPARATUS AND METHOD, AND STORAGE MEDIUM

BACKGROUND OF THE INVENTION

1. Field of the Invention

The present invention relates to an image reading apparatus and method, as well as a storage medium storing a program for executing the method, and in particular to an image reading apparatus and method that can read images from sheet media and electronic paper, as well as a storage medium storing a program for executing the method.

2. Description of the Related Art

Some image reading apparatuses such as a scanner apparatus adopt an original flow reading method that reads an image using a fixed optical system while conveying an original using an original conveying unit (ADF). Also, some image reading apparatuses adopt an original fixed reading method that sets one original each on an original platen glass and reads an image through scanning by an optical system.

Incidentally, development of "electronic paper" having advantages of both a sheet medium and a display has been pursued. The advantage of electronic paper is that it can reduce consumption of paper and thus reduce environmental burdens through forest conservation, reduction of $CO_2$ emission resulting from incineration, and so on. Against this backdrop, there has been proposed an image reading apparatus that is capable of conveying a sheet original or electronic paper to a reading position using an ADF, and reading an image on the sheet original or an image on the electronic paper (see, for example, Japanese Laid-Open Patent Publication (Kokai) No. 2008-141590).

For conventional image reading apparatuses, a technique to read an image displayed on electronic paper using the original flow reading method using an ADF has been proposed. However, a technique to optically read an image displayed on electronic paper using the original fixed reading method has not been considered yet.

SUMMARY OF THE INVENTION

The present invention provides an image reading apparatus and method that can automatically read images on a plurality of pages stored in electronic paper without a need to set the electronic paper on a page-by-page basis even in a case where the images on the plurality of pages are read using the original fixed reading method, as well as a storage medium storing a program for executing the method.

Accordingly, in a first aspect of the present invention, there is provided an image reading apparatus having a scanning unit that scans in an image on an original placed on an original platen by moving a reading unit from one end to the other end of the original, comprising a communication unit that communicates with electronic paper, a first acquisition unit that carries out communication using the communication unit, and acquires image information stored in the electronic paper, a selection unit that displays the image information, and selects an image file of which image is to be read from the image information, and a display control unit that carries out communication using the communication unit, and controls an image display on the electronic paper placed on the original platen, wherein the scanning unit reads images that are images in the image file selected by the selection unit and displayed on the electronic paper on a page-by-page basis by the display control unit.

Accordingly, in a second aspect of the present invention, there is provided an image reading method for an image reading apparatus having a scanning unit that scans in an image on an original placed on an original platen by moving a reading unit from one end to the other end of the original, comprising an acquisition step of, by using a communication unit that communicates with the electronic paper, acquiring image information from electronic paper placed on the original platen glass, a selection step of displaying the image information, and selecting an image file of which image is to be read from the image information, a display control step of carrying out communication using the communication unit, and controlling an image display on the electronic paper placed on the original platen, and a reading step of reading images that are images in the image file selected in the selection step and displayed on the electronic paper on a page-by-page basis in the display control step.

Accordingly, in a third aspect of the present invention, there is provided a computer-readable storage medium storing a program for causing an image reading apparatus to execute an image reading method for the image reading apparatus having a scanning unit that scans in an image on an original placed on an original platen by moving a reading unit from one end to the other end of the original, the method comprising an acquisition step of, by using a communication unit that communicates with the electronic paper, acquiring image information from electronic paper placed on the original platen glass, a selection step of displaying the image information, and selecting an image file of which image is to be read from the image information, a display control step of carrying out communication using the communication unit, and controlling an image display on the electronic paper placed on the original platen, and a reading step of reading images that are images in the image file selected in the selection step and displayed on the electronic paper on a page-by-page basis in the display control step.

According to the present invention, even in a case where images on a plurality of pages stored in electronic paper are read using the original fixed reading method, the images on the plurality of pages can be automatically read without the need to set the electronic paper on a page-by-page basis.

Further features of the present invention will become apparent from the following description of exemplary embodiments (with reference to the attached drawings).

BRIEF DESCRIPTION OF THE DRAWINGS

FIG. 5 is a diagram showing an exemplary image file selection screen displayed on a console.

FIGS. 11A and 11B are schematic diagrams useful in explaining an image reading method for electronic paper placed on an original platen glass in the process in FIG. 10, in which FIG. 11A shows a case where an image on an odd-numbered page is read, and FIG. 11B shows a case where an image on an even-numbered page is read.

DESCRIPTION OF THE EMBODIMENTS

The present invention will now be described in detail with reference to the drawings showing embodiments thereof.

Figure 1:
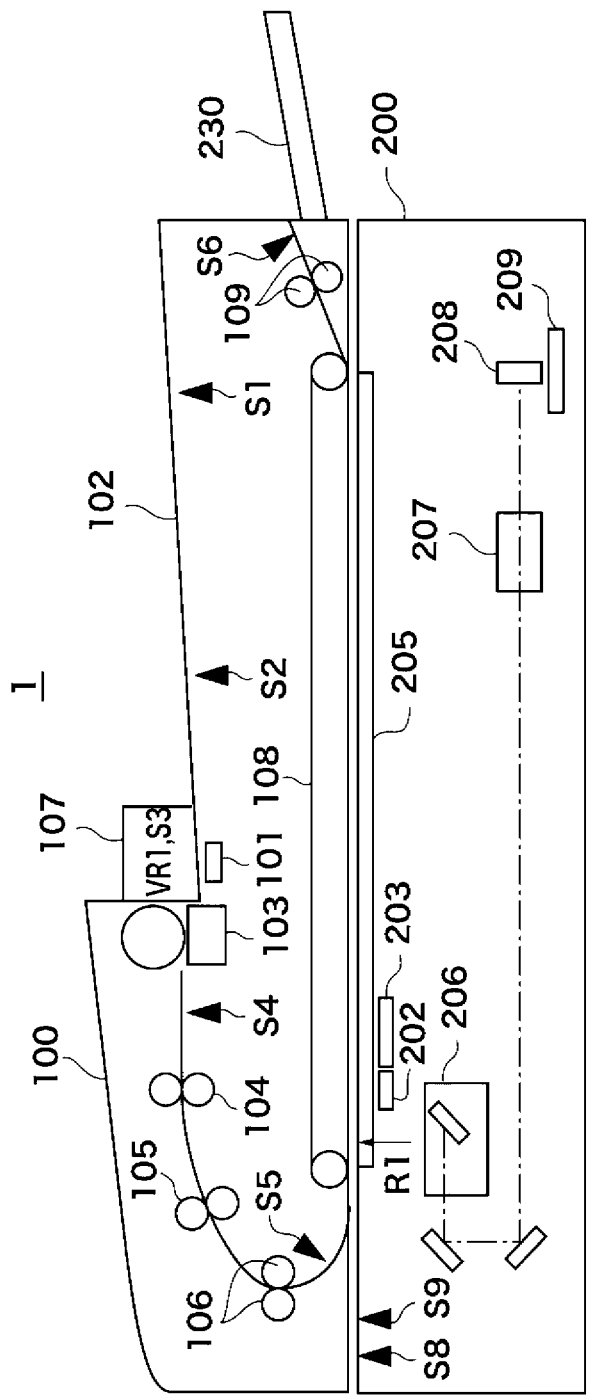
FIG. 1 is a diagram schematically showing an arrangement of an image reading apparatus according to a first embodiment of the present invention.

FIG. 1 is a diagram schematically showing an arrangement of an image reading apparatus according to a first embodiment of the present invention.

The illustrated image reading apparatus 1 has an original conveying unit (ADF) 100 and an image reader 200. The ADF 100 sequentially feeds originals of a plurality of pages in length, set on an original tray 102 sheet by sheet from the top page, and conveys each original onto an original platen glass via a curved path. The image reader 200 optically reads image information of the original on the original platen glass, carries out photoelectrical conversion, and inputs the resultant as image data. The ADF 100 is installed such as to be able to open and close relative to the image reader 200.

The image reader 200 has the original platen glass 205, a scanner unit 206 having a lamp and a mirror, not shown, a lens 207, an image sensor 208, and a controller 209. When an image on an original is to be read without using the ADF 100, the ADF 100 is opened, and the original is set on the original platen glass 205, so that the image on the original is read through scanning by the scanner unit 206.

In the ADF 100, various sensors such as S1 to S6 and VR1 are disposed. S1 and S2 designate a large-size detection sensor and a small-size detection sensor, respectively, that detect the length of an original placed on the original tray 102 in a longitudinal direction (conveying direction), and the sensors S1 and S2 are disposed in the original tray 102. The width detection volume VR1 and the width detection sensor S3, not shown, are disposed in an original width guide 107.

On a conveying route between a separation unit 103 that separates originals one by one and conveying rollers 104, there is disposed the size sensor S4 that detects a separately-fed original and the length of the original by detecting a leading end and a trailing end of the original. The lead sensor S5 that detects a leading end of an original is disposed in the vicinity of registration rollers 106. The discharge sensor S6 is disposed in the vicinity of discharge rollers 109. Also, an original set sensor S7, not shown, that determines whether or not an original is set on the original tray 102 is disposed.

Opening-closing detection sensors S8 and S9 detect an opening-closing angle of the ADF 100. The size of an original placed on the original tray 102 is determined by the opening-closing detection sensors S8 and S9 and a size sensor, not shown, as well as exposure operation.

The ADF 100 has, below the original tray 102 and in the vicinity of the separation unit 103, an electronic paper detection unit 101 for detecting electronic paper placed on the original tray 102.

The image reader 200 has, at an end of the original platen glass 205, an electronic paper detection unit 202 for detecting electronic paper placed on the original platen glass 205. Also, the image reader 200 has a page switching unit 203 at an end of the original platen glass 205. The page switching unit 203 has a function of communicating with electronic paper and causing the electronic paper to selectively display images of an image file stored in the electronic paper on a front surface (or a rear surface) thereof on a page-by-page basis (a display control unit).

Electronic paper is, for example, a liquid crystal display using a polymer film (PFLCD), not shown, and its shape can be arbitrarily altered. Moreover, an RFID that is a wireless communication tag is mounted on electronic paper. The ADF 100 is capable of conveying electronic paper similarly to sheet media.

The image reading apparatus 1 uses an original flow reading method (a flow reading mode) and an original fixed reading method (a fixed reading mode) as methods for reading an one-sided original whose front surface or a rear surface has image information recorded thereon. In the original flow reading method, an original is conveyed to a reading position R1 at a predetermined reading speed and read with the scanner unit 206 being fixed at the reading position R1, and the read original is discharged onto a discharge tray 230. In the original fixed reading method, an original is stopped on the original platen glass 205 and read through scanning by the scanner unit 206.

Specifically, when originals are stacked on the original tray 102, and a start key is depressed on a console, not shown, a feed roller, not shown, rotates to pull the top sheet of a bundle of the originals to the separation unit 103. The originals pulled to the separation unit 103 are separated one by one and conveyed to conveying rollers 104 and 105. When a leading end of the original has reached the registration rollers 106, the registration rollers 106 are at a standstill, and after a skew of the original is corrected for by forming a loop through conveyance by the conveying rollers 104 and 105, the registration rollers 106 start rotating to convey the original to a reading unit.

In the reading unit, the original is conveyed to the reading position R1 by the registration rollers 106 and a reading belt 108 at a predetermined speed. When the leading end of the original reaches the reading position R1, the scanner unit 206 fixed below the reading position R1 carries out an exposure operation to read the original being conveyed. This reading method is the flow reading mode.

On the other hand, reading of an image can be performed by stopping the original when a trailing end of the original reaches the reading position R1, and causing the scanner unit 206 to scan in the original by moving from one end thereof to the other end. This reading method is the fixed reading mode.

When the reading is completed, the original is conveyed to the discharge rollers 109 by the reading belt 108, and discharged onto the discharge tray 230 by the discharge rollers 109.

Figure 2:
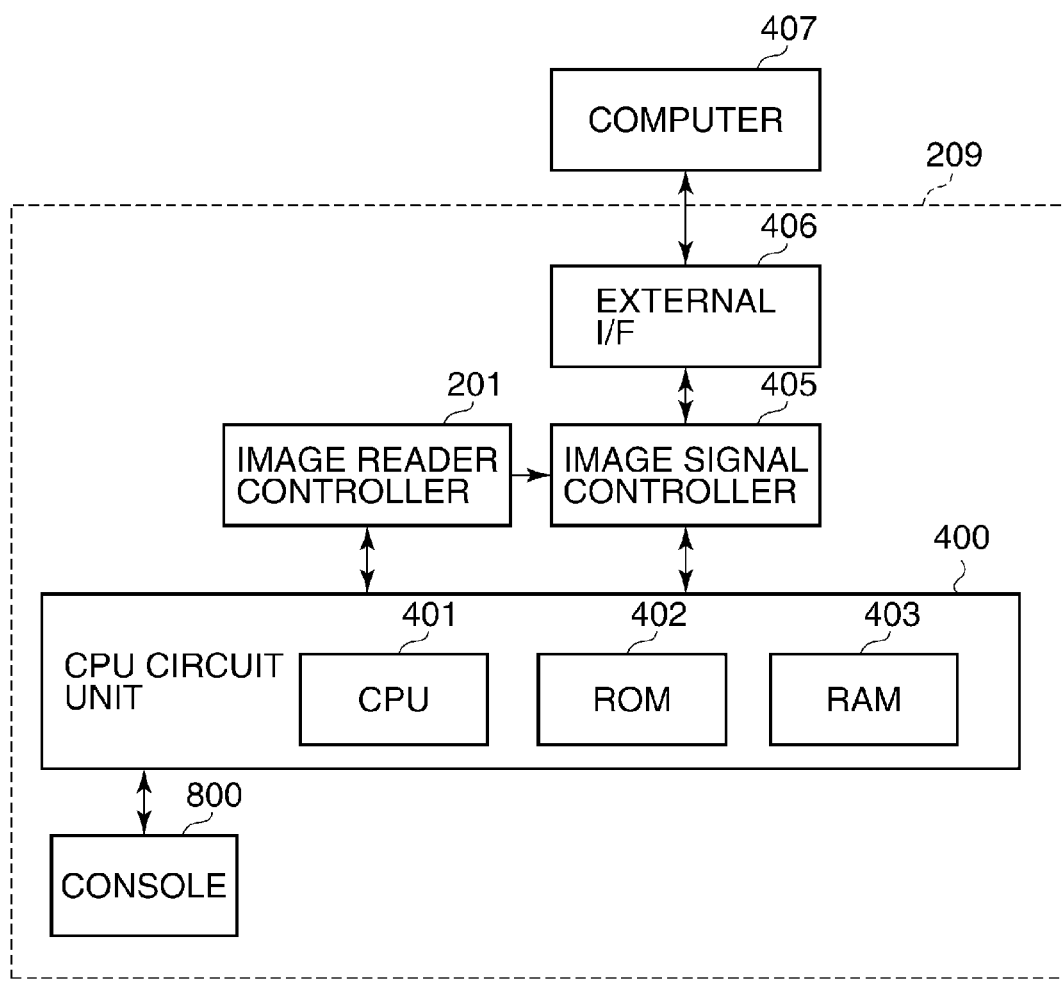
FIG. 2 is a block diagram schematically showing an arrangement of a controller of the image reading apparatus in FIG. 1.

FIG. 2 is a block diagram schematically showing an arrangement of the controller 209 of the image reading apparatus in FIG. 1.

The controller 209 controls the overall operation of the image reading apparatus, and is comprised mainly of a CPU circuit unit 400. The CPU circuit unit 400 is provided with a CPU 401, a ROM 402, a RAM 403, and so on. The ROM 402 stores programs to be executed by the CPU 401. The RAM 403 is used to temporarily hold control data used by the CPU 401 and used as a work area for computations associated with control.

The CPU circuit unit 400 controls an image reader controller 201, an image signal controller 405, and a console 800 having a touch-panel display, a keypad, and so on. The image reader controller 201 controls the ADF 100 and the image reader 200. An external I/F 406 provides interface for connecting to external devices (for example, a computer 407). The image reader controller 201 outputs image data read by the image sensor 208 to the image signal controller 405.

Figure 3:
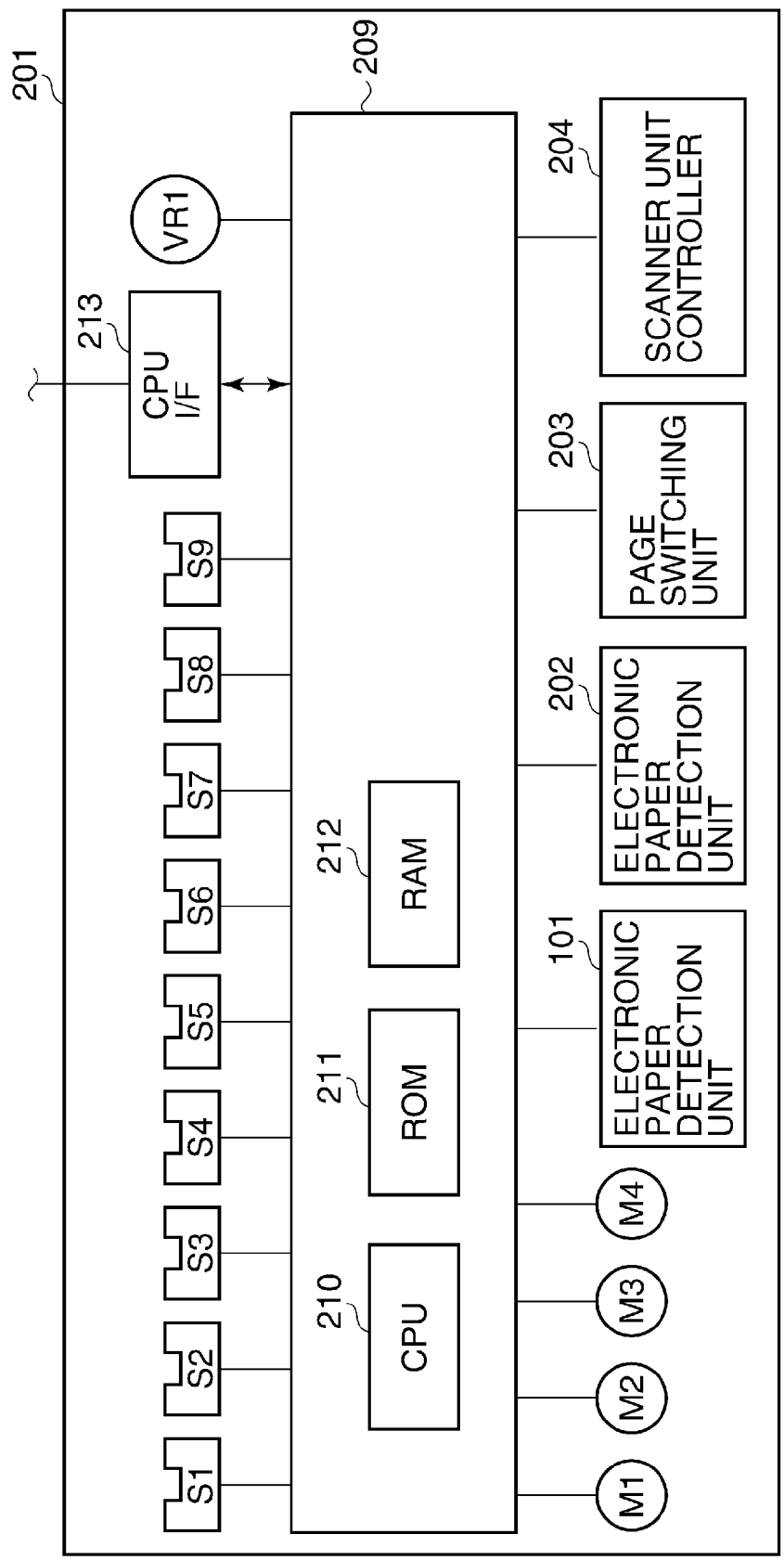
FIG. 3 is a block diagram schematically showing an arrangement of an image reader controller in FIG. 2.

FIG. 3 is a block diagram schematically showing an arrangement of the image reader controller 201 in FIG. 2.

A CPU circuit unit 209 has a CPU 210, a ROM 211 that stores programs to be executed by the CPU 210, and a RAM 212 that is used to temporarily hold control data and used as a work area for computations associated with control. The CPU 210 controls the overall operation of the image reader 200 and the ADF 100.

The CPU circuit unit 209 controls a separation motor M1 that operates to separate originals. The CPU circuit unit 209 also controls a registration motor M2 that drives the registration motors 106. The CPU circuit unit 209 also controls a belt motor M3 that drives the reading belt 108 and the discharge rollers 109.

Moreover, the CPU circuit unit 209 controls the large-size detection sensor S1 and the small-size detection sensor S2 for detecting the length of an original placed on the original tray 102. The CPU circuit unit 209 also controls the width detection volume VR1 and the width detection sensor S3, not shown, disposed in the original width guide 107. The CPU circuit unit 209 also controls the size sensor S4 that measures the length of an original at the same time when detecting a separately-fed original by detecting a leading end and a trailing end of the original, the lead sensor S5 that detects a leading end of an original and indicates a read signal, and the discharge sensor S6. The original set sensor 7 is a sensor for detecting the presence or absence of an original set on the original tray 102.

In the CPU circuit unit 209, a scanner motor M4 for causing the scanner unit 206 disposed in the image reader 200 to scan while moving, and the opening-closing detection sensors S8 and S9 are disposed. The CPU circuit unit 209 is connected to a scanner unit controller 204 that controls a lamp and an image sensor in the scanner unit 206.

Moreover, the CPU circuit unit 209 is connected to the electronic paper detection units 101 and 202 for detecting electronic paper, and the page switching unit 203 that allows switching between pages of electronic paper, and controls these units using the CPU 210. Further, the CPU circuit unit 209 carries out real-time communication with the CPU 401 in the CPU circuit unit 400 via a CPU_I/F 213.

The electronic paper detection units 101 and 202 are provided with an antenna, not shown, a transmitter, a receiver, and so on for communicating with the electronic paper using the RFID, and are capable of detecting the electronic paper using the RFID. It should be noted that as a means for detecting the electronic paper, there may be an arrangement in which the electronic paper is provided with an electrode to which electric power is applied from the ADF, and an arrangement in which the electronic paper is detected using a reflectivity of an optical sensor or the like, but the present invention is not limited to them.

Next, a description will be given of a process in a case where images are read in the fixed reading mode from electronic paper storing an image file of a plurality of pages in length.

Figure 4:
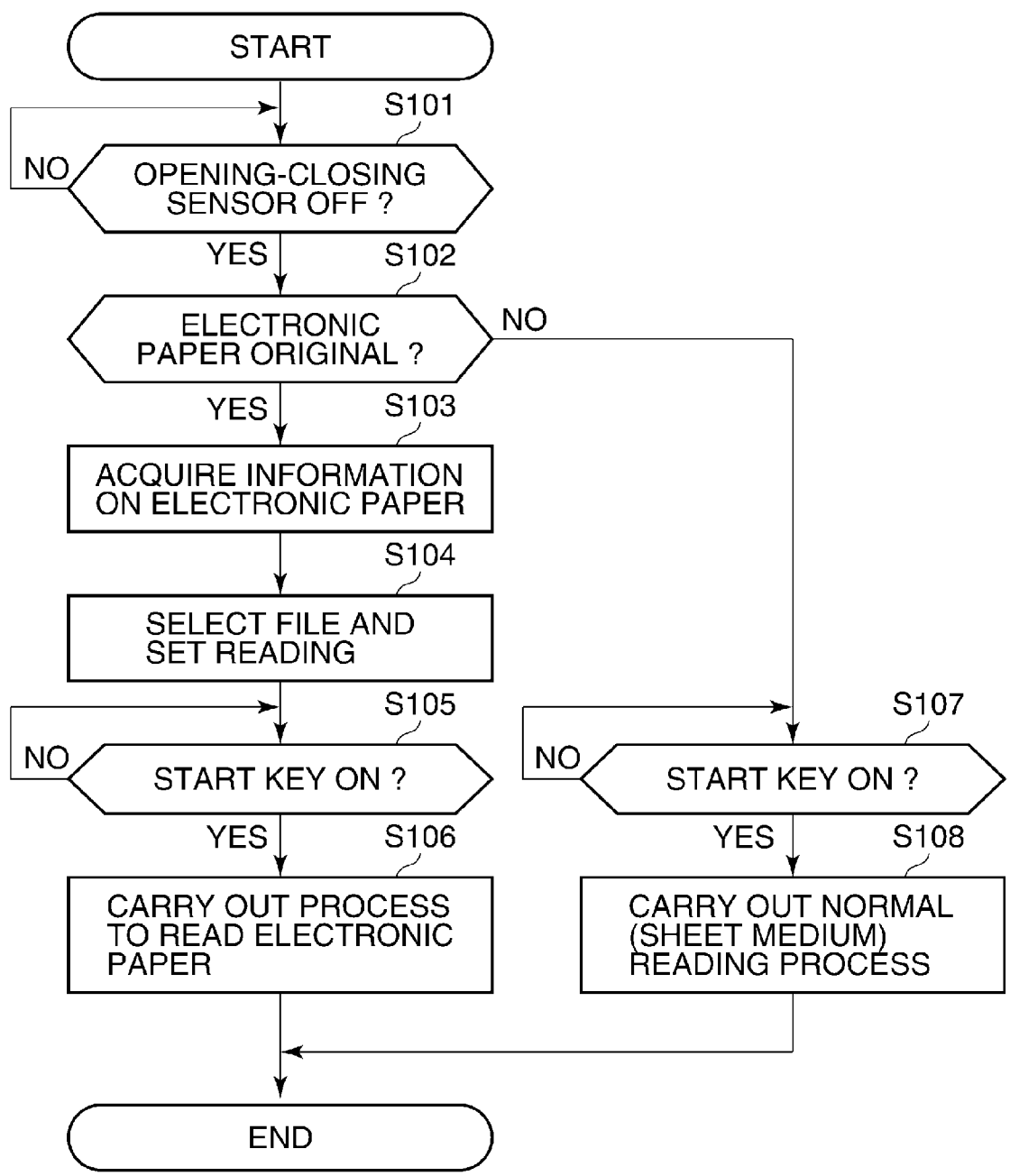
FIG. 4 is a flowchart showing an exemplary electronic paper determination process executed by the image reading apparatus.

FIG. 4 is a flowchart showing an exemplary electronic paper determination process executed by the image reading apparatus 1. This process is executed by the CPU 210 in the CPU circuit unit 209.

First, a user opens the ADF 100 and places electronic paper as an original on the original platen glass 205. The CPU 210 monitors the opening-closing detection sensors S8 and S9, and determines whether or not the opening-closing detection sensors S8 and S9 have been turned off (step S101). When the opening-closing detection sensors S8 and S9 have been turned off, the CPU 210 determines that there is an original on the original platen glass 205, and proceeds to step S102.

Next, in the step S102, the CPU 210 determines whether or not a detection signal has been received from the electronic paper detection unit 202. When a detection signal has not been received (NO in the step S102), the CPU 210 determines that the original is a sheet medium, and waits until a start key, not shown, on the console 800 is depressed (step S107). When the start key is depressed (YES in the step S107), the CPU 210 executes a normal (sheet medium) image reading process (step S108).

On the other hand, when the electronic paper detection unit 202 receives a signal from the RFID tag mounted in the electronic paper, and the CPU 210 receives a detection signal from the electronic paper detection unit 202, the CPU 210 determines that the original is electronic paper (YES in the step S102). Next, in step S103, the CPU 210 acquires various kinds of information from the electronic paper. The acquired information includes original-related information such as image information (file information) stored in the electronic paper, the number of pages, and a size.

Next, in step S104, the CPU 210 displays a screen 500 as shown in FIG. 5 on the console 800 based on the information acquired in the step S103, and prompts the user to select a file of which images are to be read. In the illustrated example, a file name "aaa" is selected (a filled-in area). When the user selects a file, the CPU 210 displays a setting screen, not shown, and accepts detailed settings on reading conditions. It should be noted that the setting screen can be displayed in any format and any way as long as the setting screen is capable of accepting the reading conditions.

When completing the file selection on the screen 500, the user depresses an OK button 501. On the other hand, to cancel the process, the user depresses a cancel button 502. Next, the CPU 201 determines whether or not the start button, not shown, has been depressed on the console 800 (step S105), and when determining that the start button has been depressed, the CPU 201 starts an electronic paper image reading process based on the set reading conditions (step S106).

It should be noted that in the image reading apparatus 1, images can also be read in the fixed reading mode using the ADF 100. In this case, the CPU 201 determines whether or not an original is placed on the original tray 102 using the original set sensor S7, not shown, and when an original is placed, the CPU 210 executes the processes in the steps S102 to S105 in FIG. 4. Whether or not an original is placed on the original tray 102 is determined using the electronic paper detection unit 101. When the start key, not shown, is depressed after the processes in the steps S102 to S105, the CPU 210 conveys the electronic paper on the original tray 102 to the original platen glass 205 and stops the same, and causes the scanner unit 206 to scan in images displayed on the electronic paper. The page switching unit 203 performs switching between images displayed on the electronic paper.

Figure 6:
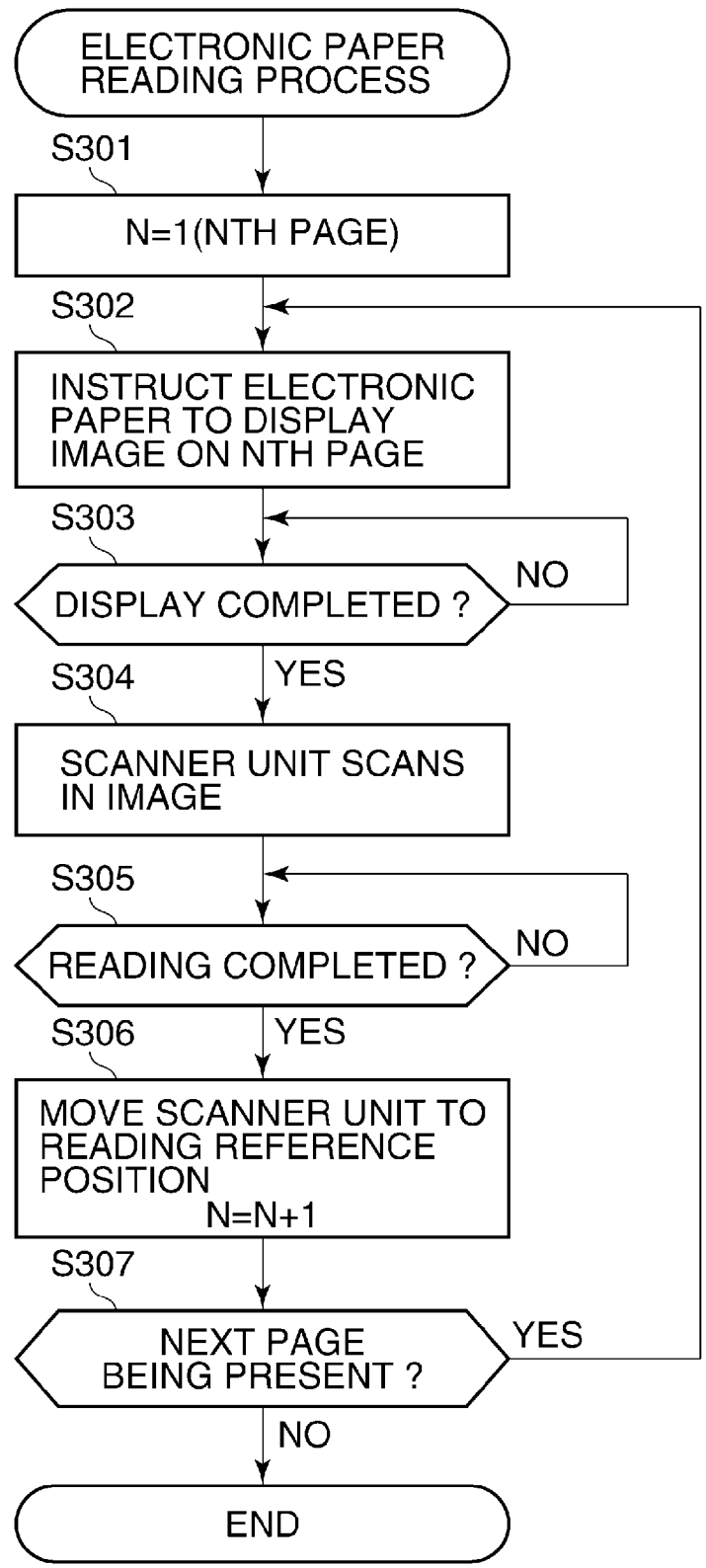
FIG. 6 is a flowchart showing in detail an electronic paper image reading process in step S106 in FIG. 4.

FIG. 6 is a flowchart showing in detail the electronic paper image reading process in the step S106 in FIG. 4. In this process, it is assumed that images are read in the fixed reading mode from electronic paper storing an image file having images of two pages.

Figure 7:
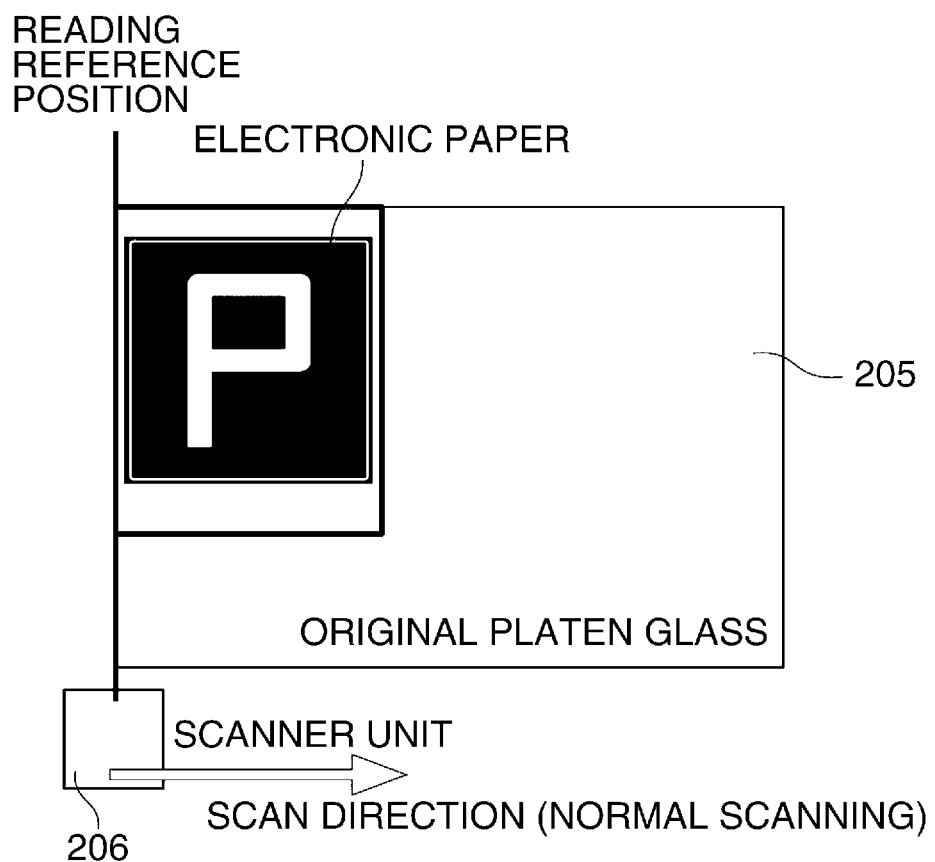
FIG. 7 is a schematic diagram useful in explaining an image reading method for electronic paper placed on an original platen glass in the process in FIG. 6.

FIG. 7 is a schematic diagram useful in explaining an image reading method for the electronic paper placed on the original platen glass 205 in the process in FIG. 6. The electronic paper may be placed on the original platen glass 205 by either the user or the ADF 100. It is assumed that the electronic paper placed on the original platen glass 205 has one end thereof positioned along an illustrated reading reference position.

Referring to FIG. 6, when the electronic paper image reading process is started, the CPU 210 sets "1", which is indicative of the first page, to the number of pages N (step S301). Then, the CPU 210 communicates with the electronic paper on the original platen glass 205 using the page switching unit 203, and instructs the electronic paper to display an image on the Nth page (step S302).

Next, the CPU 210 waits for completion of the image display by the electronic paper (YES in step S303), and drives the scanner unit 206 to perform scanning in a scan direction in FIG. 7 to read the image on the Nth page (step S304). When the reading is completed (YES in step S305), the CPU 210 drives the scanner unit 206 to move to the reading reference position, and adds 1 to the number of pages N (step S306).

Next, the CPU 210 determines whether or not there is any page to be read next (step S307). When there is any page to be read next, the CPU 210 instructs the electronic paper to display an image on the Nth page (step S302), and carries out the processes in the step S303 and the subsequent steps again. When, in the step S307, there is no page to be read next (NO in the step S307), the CPU 210 terminates the present process. In the case where the user sets the electronic paper on the original platen glass 205, the CPU 210 simply terminates the present process. On the other hand, in the case where the electronic paper is set on the original platen glass 205 using the ADF 100, the CPU 210 conveys the electronic paper to the discharge tray 230 and terminates the present process.

According to the first embodiment described above, when images on a plurality of pages are to be read from electronic paper in the fixed reading mode, the CPU 210 causes the page switching unit 203 to display an image on the Nth page of the electronic paper, and the scanner unit 206 scans in the image. After that, the CPU 210 causes the page switching unit 203 to display an image on the N+1th page on the electronic paper, and the scanner unit 206 scans in the image. This is repeated a number of times corresponding to the number of pages. As a result, even when images on a plurality of pages stored in electronic paper are to be read in the original fixed reading method, the images on the plurality of pages can be automatically read without the need to reset the electronic paper for each page.

An image reading apparatus according to a second embodiment of the present invention is the same as the first embodiment described above in terms of an arrangement (FIGS. 1 to 3) and an electronic paper determination process (FIGS. 4 and 5), and parts similar to those of the first embodiment are denoted by the same reference numerals, and description thereof is omitted. Only features that are different from those of the first embodiment will be described below.

Next, a detailed description will be given of another embodiment in which electronic paper storing a plurality of pages to which the present invention is applied is read using the image reader 200.

Figure 8:
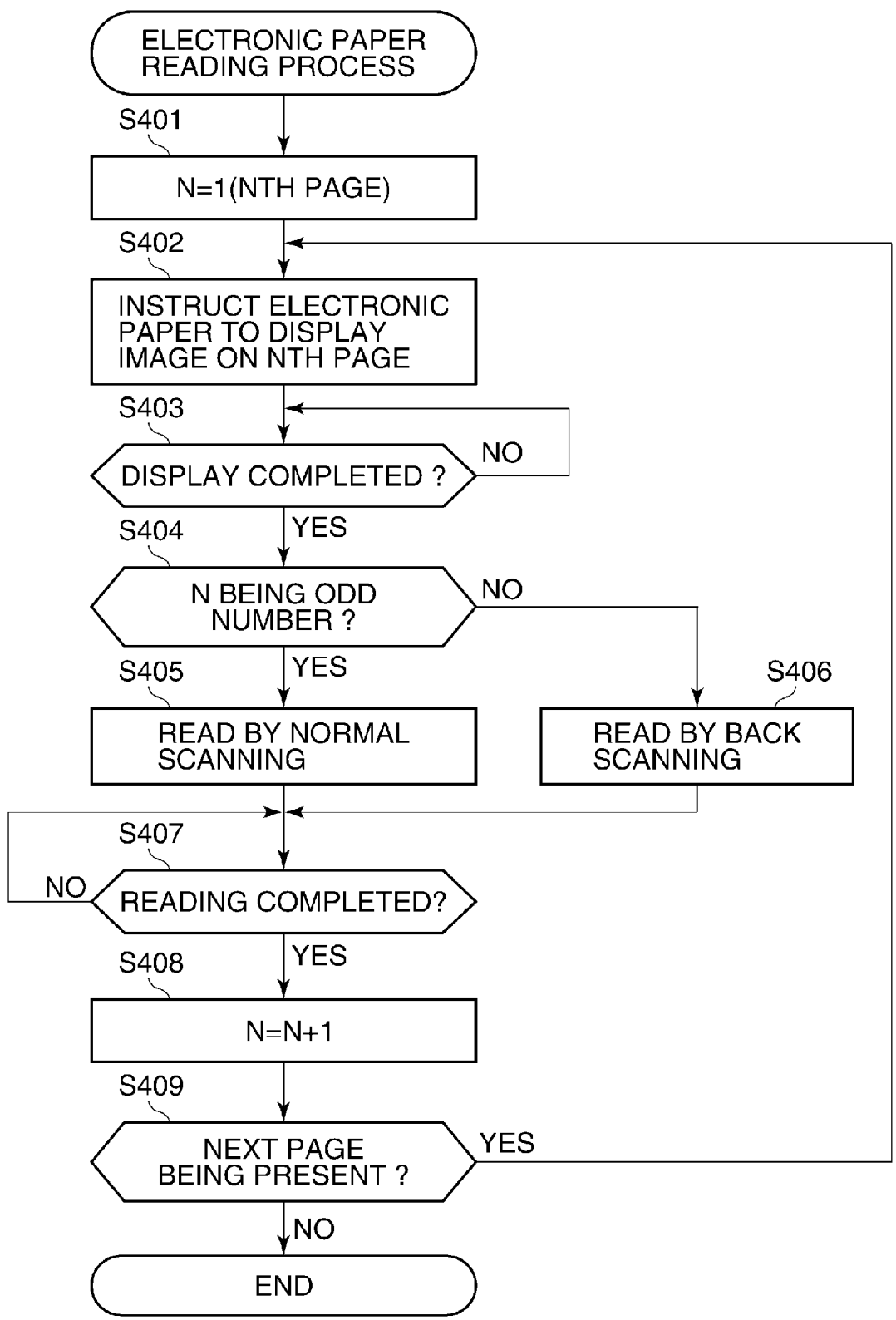
FIG. 8 is a flowchart showing in detail an electronic paper image reading process carried out by an image reading apparatus according to a second embodiment of the present invention.

FIG. 8 is a flowchart showing in detail an electronic paper image reading process carried out by the image reading apparatus according to the second embodiment of the present invention. In this process, it is assumed that images are read in the fixed reading mode from electronic paper storing an image file having images of two pages. It is also assumed that this process is executed in the step S106 in FIG. 4.

Figure 9:
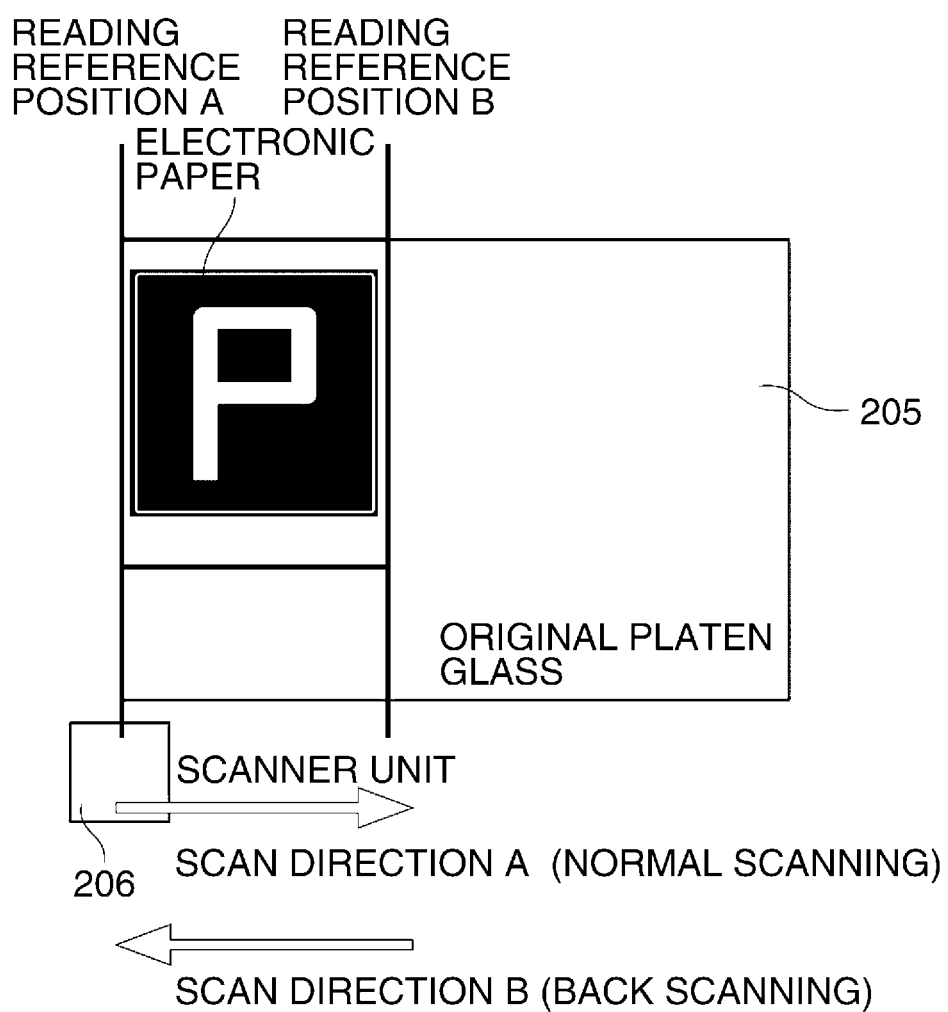
FIG. 9 is a schematic diagram useful in explaining an image reading method for electronic paper placed on an original platen glass in the process in FIG. 8.

FIG. 9 is a schematic diagram useful in explaining an image reading method for the electronic paper placed on the original platen glass 205 in the process in FIG. 8. The electronic paper may be placed on the original platen glass 205 by either the user or the ADF 100. It is assumed that the electronic paper placed on the original platen glass 205 has one end thereof positioned along an illustrated reading reference position A.

Referring to FIG. 8, when the electronic paper image reading process is started, the CPU 210 sets "1", which is indicative of the first page, to the number of pages N (step S401). Then, the CPU 210 communicates with the electronic paper on the original platen glass 205 using the page switching unit 203, and instructs the electronic paper to display an image on the Nth page (step S402).

Next, the CPU 210 waits for completion of the image display by the electronic paper (YES in the step S403), and determines whether or not the number of pages N is an odd number (step S404). When determining that the number of pages N is an odd number, the CPU 210 drives the scanner unit 206 to perform scanning in a scan direction A in FIG. 9 to read the image on the Nth page (the odd-numbered page) (step S405). The scan direction A is a scan direction in so-called normal scanning. Assuming that the reading reference position A is a leading end of the electronic paper, and a reading reference position B is a trailing end of the electronic paper, the scanner unit 206 scans the electronic paper by moving from the leading end to the trailing end of the electronic paper. When the reading is completed (YES in step S407), the CPU 210 adds 1 to the number of pages N (step S408). It should be noted that when the reading is completed, the CPU 210 provides control to stop the scanner unit 206 at the reading reference position B.

Next, the CPU 210 determines whether or not there is any page to be read next (step S409). When there is any page to be read next, the CPU 210 returns to the step S402 where it instructs the electronic paper to display an image on the N page (step S402). Then, the CPU 210 waits for completion of the image display by the electronic paper (YES in the step S403), and determines whether or not the number of pages N is an odd number (step S404).

When, as a result of the determination in the step S404, it is determined that the number of pages N is not an odd number, the CPU 210 proceeds to step S406. In the step S406, the CPU 210 drives the scanner unit 206 to perform scanning in a scan direction B in FIG. 9 to read the image on the Nth page (the even-numbered page). The scan direction B is a scan direction in so-called back scanning. Assuming that the reading reference position A is the leading end of the electronic paper, and the reading reference position B is the trailing end of the electronic paper as described above, the scanner unit 206 scans the electronic paper by moving from the trailing end to the leading end of the electronic paper. When the reading is completed (YES in the step S407), the CPU 210 adds 1 to the number of pages N (step S408). It should be noted that when the reading is completed, the CPU 210 provides control to stop the scanner unit 206 at the reading reference position A.

Next, the CPU 210 determines whether or not there is any page to be read next (step S409). When there is no page to be read next, the present process is terminated. In the case where the electronic paper is set on the original platen glass 205 by the user, the CPU 210 simply terminates the present process. On the other hand, in the case where the electronic paper is set on the original platen glass 205 using the ADF 100, the CPU 210 conveys the electronic paper to the discharge tray 230 and terminates the present process.

According to the second embodiment described above, the number of pages N of images stored in the electronic paper is counted, and when the number of pages N is an odd number, the CPU 210 causes the scanner unit 206 to scan in an image on the electronic paper by moving from a leading end to a trailing end of the electronic paper (normal scanning). On the other hand, when the number of pages N is not an odd number, the CPU 210 causes the scanner unit 206 to scan in an image on the electronic paper by moving from the trailing end to the leading end of the electronic paper (back scanning). In this way, by making use of the back scanning, wasted motion of the scanner unit can be avoided, and images can be efficiently read.

In the above described embodiment, because an image on an odd-numbered page is read from the leading end of the electronic paper (the reading reference position A), and an image on an even-numbered page is read from the trailing end of the electronic paper (the reading reference position B), it is necessary to carry out image processing for changing the direction of an image. This image processing may be executed by either the CPU 210 or the image signal controller 405.

An image reading apparatus according to a third embodiment of the present invention is the same as the first embodiment described above in terms of an arrangement (FIGS. 1 to 3) and an electronic paper determination process (FIGS. 4 and 5), and parts similar to those of the first embodiment are designated by the same reference numerals, and description thereof is omitted. Only features that are different from those of the first embodiment will be described below.

Figure 10:
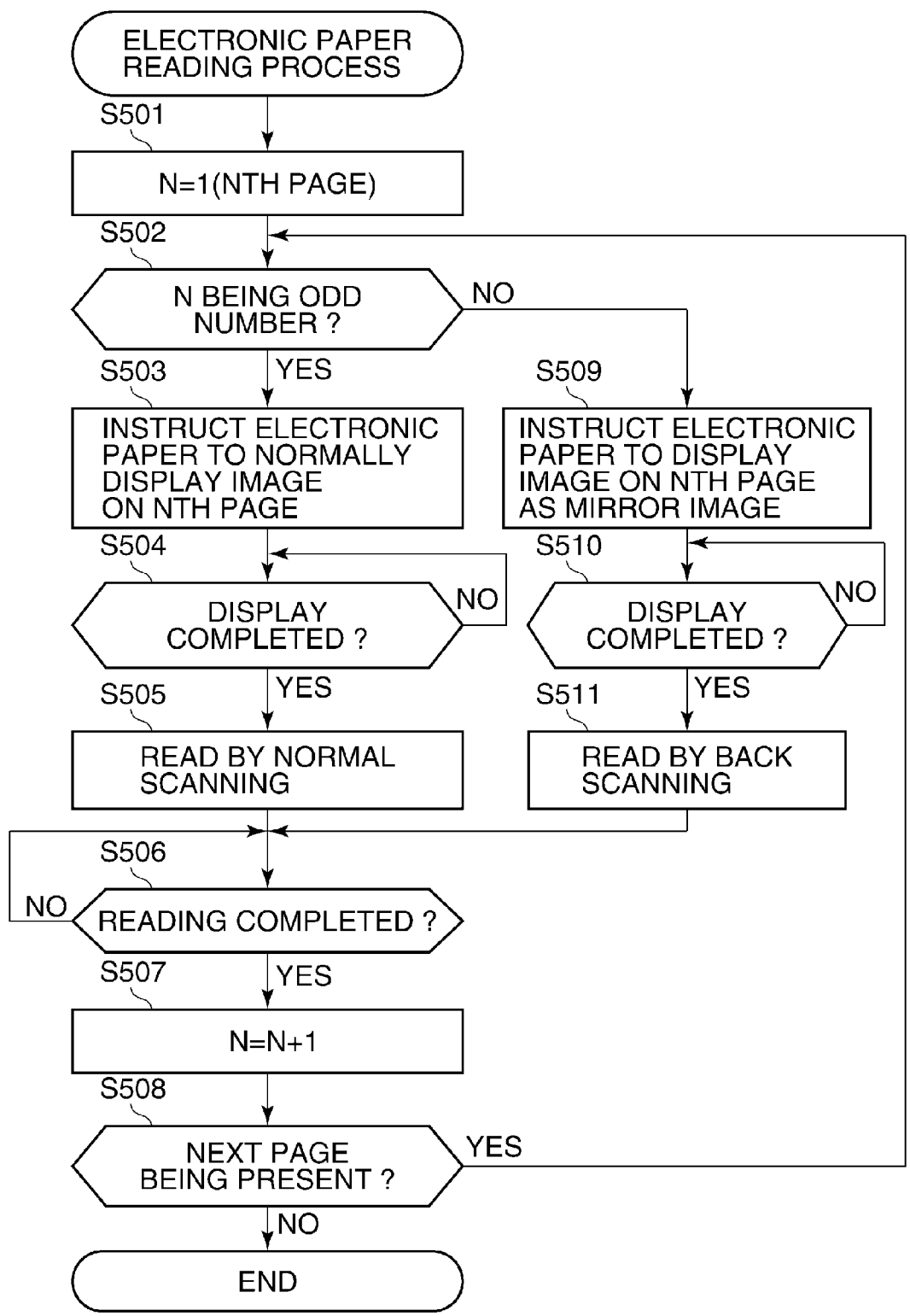
FIG. 10 is a flowchart showing in detail an electronic paper image reading process carried out by an image reading apparatus according to a third embodiment of the present invention.

FIG. 10 is a flowchart showing in detail an electronic paper image reading process carried out by the image reading apparatus according to the third embodiment of the present invention. In this process, it is assumed that images are read in the fixed reading mode from electronic paper storing an image file having images of two pages. It is also assumed that this process is executed in the step S106 in FIG. 4.

FIGS. 11A and 11B are schematic diagrams useful in explaining an image reading method for the electronic paper placed on the original platen glass 205 in the process in FIG. 10, in which FIG. 11A shows a case where an image on an odd-numbered page is read, and FIG. 11B shows a case where an image on an even-numbered page is read. The electronic paper may be placed on the original platen glass 205 by either the user or the ADF 100. It is assumed that the electronic paper placed on the original platen glass 205 has one end thereof positioned along a reading reference position A in FIG. 11A.

Referring to FIG. 10, when the electronic paper image reading process is started, the CPU 210 sets "1", which is indicative of the first page, to the number of pages N (step S501). Then, the CPU 210 determines whether or not the number of pages N is an odd number (step S502). When determining that the number of pages N is an odd number, the CPU 210 communicates with the electronic paper on the original platen glass 205 using the page switching unit 203, and instructs the electronic paper to normally display an image on the Nth page (step S503).

Next, the CPU 210 waits for completion of the image display by the electronic paper (YES in step S504), and proceeds to step S505. In the step S505, the CPU 210 drives the scanner unit 206 to perform scanning in a scan direction A from the reading reference position A in FIG. 11A to read the image on the Nth page (an odd-numbered page). The scan direction A is a scan direction in so-called normal scanning.

Assuming that the reading reference position A is a leading end of the electronic paper, and a reading reference position B is a trailing end of the electronic paper, the scanner unit 206 scans in the electronic paper by moving from the leading end to the trailing end of the electronic paper. When the reading is completed (YES in the step S506), the CPU 210 adds 1 to the number of pages N (step S507). It should be noted that when the reading is completed, the CPU 210 provides control to stop the scanner unit 206 at the reading reference position B.

Next, the CPU 210 determines whether or not there is any page to be read next (step S508). When there is any page to be read next, the CPU 210 returns to the step S502 where it determines whether or not the number of pages N is an odd number (step S502). When, as a result of the determination, the number of pages N is not an odd number, the CPU 210 causes the page switching unit 203 to communicate with the electronic paper on the original platen glass 205, and instructs the electronic paper to display an image on the Nth page as a mirror image (step S509).

Next, the CPU 210 waits for completion of the image display by the electronic paper (YES in the step S510), and proceeds to step S511. In the step S511, the CPU 210 drives the scanner unit 206 waiting at the reading reference position B to perform scanning in a scan direction B and read an image on the Nth page (an even-numbered page). The scan direction B is a scan direction in so-called back scanning. Assuming that the reading reference position A is the leading end of the electronic paper, and the reading reference position B is the trailing end of the electronic paper as described above, the scanner unit 206 scans in the electronic paper by moving from the trailing end to the leading end of the electronic paper. When the reading is completed (YES in the step S506), the CPU 210 adds 1 to the number of pages N (step S507). It should be noted that when the reading is completed, the CPU 210 provides control to stop the scanner unit 206 at the reading reference position A.

Next, the CPU 210 determines whether or not there is any page to be read next (step S508). When there is no page to be read next, the CPU 210 terminates the present process. In the case where the electronic paper is set on the original platen glass 205 by the user, the CPU 210 simply terminates the present process. On the other hand, in the case where the electronic paper is set on the original platen glass 205 using the ADF 100, the CPU 210 conveys the electronic paper to the discharge tray 230 and terminates the present process.

According to the third embodiment described above, the number of pages N of images stored in the electronic paper is counted, and when the number of pages N is an odd number, the CPU 210 provides control to normally display an image on the odd-numbered page on the electronic paper. On the other hand, when the number of pages N is not an odd number, the CPU 210 provides control to display an image on an even-numbered page as a mirror image on the electronic paper. Thus, the direction of an image read from the electronic paper is the same as the direction of an image read at the time of normal scanning irrespective of whether a page number is odd or even, and it is thus unnecessary to perform image processing for changing the direction of an image.

It should be noted that control may be provided such that which page of an image file is to be displayed on the electronic paper is determined, and when it is determined that an odd-numbered page is to be displayed, an image on the odd-numbered page is normally displayed. Further, control may be provided such that when it is determined that the number of pages N is not an odd number, an image on an even-numbered page is displayed as a mirror image on the electronic paper.

It may be arranged such that, for example, the CPU 210 sets the reading reference positions in the first to third embodiments based on size information acquired from electronic paper. Also, the CPU 210 may set the reading reference positions according to scan results obtained when images are read. Further, it may be arranged such that in a case where electronic paper on the original tray 102 is conveyed onto the original platen glass 205 using the ADF 100, and images are read in the fixed reading mode, the large-size detection sensor S1 and the small-size detection sensor S2 detect the size of the electronic paper, and based on the detection result, the CPU 210 sets the reading reference positions.

It goes without saying that the effects of the present invention can be obtained by combining the above described first to third embodiments with each other. For example, when the first and second embodiments are combined, it may be arranged such that the process in FIG. 6 or the process in FIG. 8 is executed according to whether or not the direction of an image displayed on electronic paper is changeable. Also, when the first and third embodiments are combined, it may be arranged such that the process in FIG. 6 or the process in FIG. 10 is executed according to whether or not a mirror image can be displayed on electronic paper.

Although in the first to third embodiments described above, the image reading apparatuses such as a scanner apparatus were described, it goes without saying that the present invention may be applied to an image forming apparatus, a multifunctional peripheral, and so on having a print function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-095924 filed Apr. 10, 2009, which is hereby incorporated by reference herein in its entirety.

What is claimed is:

1. An image reading apparatus for stopping an original at a predetermined position on an original platen and causing a scanning unit to scan the original by moving from one end to the other end of the original, so that an image on the original is read through scanning by the scanning unit, comprising:
   a first determination unit adapted to determine whether or not the original to be scanned is an electronic paper having a display unit on one side thereof;
   a communication unit adapted to communicate with the electronic paper, when said first determination unit determines that the original is the electronic paper;
   a first acquisition unit adapted to carry out communication using said communication unit with the electronic paper to acquire images for a plurality of pages from an image file stored in the electronic paper;
   a setting unit adapted to set a variable number N indicating that an image to be displayed on the electronic paper is an image for what numbered page among the acquired images, wherein the variable number N is set to 1 when the images are acquired by said first acquiring unit;
   a display control unit adapted to carry out communication using said communication unit with the electronic paper to control the electronic paper so that an image for an Nth page among the acquired images is displayed thereon based on the variable number N set by said setting unit;
   a second determination unit adapted to determine whether the variable number N is an odd number,
   wherein when said second determination unit determines that the variable number N is an odd number, the scanning unit scans the image for the Nth page by moving from a leading end to a trailing end of the electronic paper, and when said second determination unit determines that the variable number N is not an odd number, the scanning unit scans the image for the Nth page by moving from the trailing end to the leading end of the electronic paper; and
   an incrementing unit adapted to increment the variable number N set by said setting unit by 1, when the image reading apparatus finishes reading the image for the Nth page;
   wherein in the case where there is no image for the Nth page in the image file after the incrementing by said incrementing unit, the image reading apparatus sequentially repeats the display control by said display control unit, the determination by said second determination unit, the reading of the image for the Nth page based on a result of the determination, and the incrementing by said incrementing unit while the electronic paper is kept stopped at the predetermined position.

2. An image reading apparatus as claimed in claim 1, further comprising:
   a determination unit adapted to determine whether the original placed on the original platen is electronic paper; and
   a second acquisition unit adapted to acquire information about a file name, the number of pages, and a size of an image file stored in the electronic paper as image information from the one determined as the electronic paper by said determination unit.

3. The image reading apparatus as claimed in claim 1,
   wherein when said second determination unit determines that the variable number N is an odd number said display control unit controls the electronic paper so as to normally display the image for the Nth page on the electronic paper, and when said second determination unit determines that the variable number N is not an odd number, said display control unit controls the electronic paper so as to display a mirror image of the image for the Nth page on the electronic paper.

4. An image reading method for an image reading apparatus for stopping an original at a predetermined position on an original platen and causing a scanning unit to scan the original by moving from one end to the other end of the original, so that an image on the original is read through scanning by the scanning unit, comprising:
   a first determination step of determining whether or not the original to be scanned is an electronic paper having a display unit on one side thereof;
   an acquisition step of, by using a communication unit that communicates with the electronic paper, when said first determination step determines that the original is the electronic paper, acquiring images for a plurality of pages from an image file from the electronic paper placed on the original platen glass;

a setting step adapted to set a variable number N indicating that an image to be displayed on the electronic paper is an image for what numbered page among the acquired images, wherein the variable number N is set to 1 when the images are acquired by said acquisition step;

a display control step of carrying out communication using the communication unit with the electronic paper for controlling the electronic paper so that an image for an Nth page among the acquired images is displayed therein based on the variable number N set by said setting step; and a second determination step of determining whether the variable number N is an odd number, wherein when said second determination step determines that the variable number N is an odd number, the scanning unit scans the image for the Nth page by moving from a leading end to a trailing end of the electronic paper, and when said second determination step determines that the variable number N is not an odd number, the scanning unit scans the image for the Nth page by moving from the trailing end to the leading end of the electronic paper; and an incrementing step for incrementing the variable number N set by said setting step by 1, when the image reading apparatus finishes reading the image for the Nth page;

wherein in the case where there is no image for the Nth page in the image file after the incrementing by said incrementing step, the image reading apparatus sequentially repeats the display control by said display control step, the determination by said second determination step, the reading of the image for the Nth page based on a result of the determination, and the incrementing by said incrementing step while the electronic paper is kept stopped at the predetermined position.

5. A non-transitory computer-readable storage medium storing a program for causing an image reading apparatus to execute an image reading method for an image reading apparatus for stopping an original at a predetermined position on an original platen and causing a scanning unit to scan the original by moving from one end to the other end of the original, so that an image on the original is read through scanning by the scanning unit, the method comprising:

a first determination step of determining whether or not the original to be scanned is an electronic paper having a display unit on one side thereof;

an acquisition step of, by using a communication unit that communicates with the electronic paper, when said first determination step determines that the original is the electronic paper, acquiring images for a plurality of pages from an image file from the electronic paper placed on the original platen glass;

a setting step adapted to set a variable number N indicating that an image to be displayed on the electronic paper is an image for what numbered page among the acquired images, wherein the variable number N is set to 1 when the images are acquired by said acquisition step;

a display control step of carrying out communication using the communication unit with the electronic paper for controlling the electronic paper so that an image for an Nth page among the acquired images is displayed therein based on the variable number N set by said setting step; and a second determination step of determining whether the variable number N is an odd number, wherein when said second determination step determines that the variable number N is an odd number, the scanning unit scans the image for the Nth page by moving from a leading end to a trailing end of the electronic paper, and when said second determination step determines that the variable number N is not an odd number, the scanning unit scans the image for the Nth page by moving from the trailing end to the leading end of the electronic paper; and an incrementing step for incrementing the variable number N set by said setting step by 1, when the image reading apparatus finishes reading the image for the Nth page;

wherein in the case where there is no image for the Nth page in the image file after the incrementing by said incrementing step, the image reading apparatus sequentially repeats the display control by said display control step, the determination by said second determination step, the reading of the image for the Nth page based on a result of the determination, and the incrementing by said incrementing step while the electronic paper is kept stopped at the predetermined position.

\* \* \* \* \*